(12) United States Patent
Kong et al.

(10) Patent No.: US 7,302,508 B2
(45) Date of Patent: Nov. 27, 2007

(54) APPARATUS AND METHOD FOR HIGH SPEED DATA TRANSFER

(75) Inventors: Dehai (Roy) Kong, Sunnyvale, CA (US); Zhou (Mike) Hong, Cupertino, CA (US)

(73) Assignee: Via Technologies, Inc., Hsin-Tien, Taipei (TW)

( * ) Notice: Subject to any disclaimer, the term of this patent is extended or adjusted under 35 U.S.C. 154(b) by 437 days.

(21) Appl. No.: 10/740,948

(22) Filed: Dec. 18, 2003

(65) Prior Publication Data
US 2004/0255061 A1 Dec. 16, 2004

Related U.S. Application Data

(63) Continuation of application No. 10/459,369, filed on Jun. 10, 2003, now abandoned.

(51) Int. Cl.
G06F 13/14 (2006.01)
G06F 1/00 (2006.01)

(52) U.S. Cl. .................. 710/107; 710/58; 713/500

(58) Field of Classification Search ................ 710/117, 710/110, 107, 25, 58, 36, 45; 711/167–169; 713/400, 500, 502
See application file for complete search history.

(56) References Cited

U.S. PATENT DOCUMENTS 5,463,753 A * 10/1995 Fry et al. .................... 711/146
5,473,762 A * 12/1995 Krein et al. ................. 710/107
6,651,148 B2 * 11/2003 Widdup ...................... 711/158
6,748,505 B1 * 6/2004 Dakhil ........................ 711/167
6,782,460 B2 * 8/2004 Satagopan et al. .......... 711/169
7,155,631 B2 * 12/2006 Kiriake ....................... 713/600

* cited by examiner

*Primary Examiner*—Glenn A. Auve
*Assistant Examiner*—Trisha Vu
(74) *Attorney, Agent, or Firm*—Thomas, Kayden, Horstemeyer & Risley

(57) ABSTRACT

An improved target and initiator. The initiator provides a starting address and length information on a bus synchronously with a clock signal. While the starting address and length information are present on the bus, the initiator provides a write or a read request signal that is activated and deactivated synchronously. The initiator then receives from the target unit a grant signal that is activated and deactivated synchronously. After the grant signal is deactivated, for a write operation, the initiator provides a number of write data items on the bus synchronously for capture by the target unit. For a read operation, the target provides a number of read data items on the bus synchronously for capture by the initiator unit. One data item provided in each clock cycle of the clock signal and the number of data items is determined by the length information provided.

30 Claims, 12 Drawing Sheets

APPARATUS AND METHOD FOR HIGH SPEED DATA TRANSFER

CROSS REFERENCE TO EARLIER APPLICATION

This is a continuation application claiming the benefit of prior-filed U.S. patent application Ser. No. 10/459,369, filed Jun. 10, 2003 now abandoned, entitled "APPARATUS AND METHOD FOR HIGH SPEED DATA TRANSFER."

FIELD OF THE INVENTION

The present invention relates to the field of digital communications. More particularly, the present invention relates to a communications protocol for transferring information over a communications bus.

BACKGROUND OF THE INVENTION

Communications buses have many applications, for example, in transferring digital data within computers and integrated circuits. A communications bus can have many features, however, one of its most important features is that it provides a shared communication link. Such a shared communication link can allow for two units to communicate, such as a processor and memory of a computer, or can allow for many thousands of units to communication, such as many interconnected computers on the Internet. In this way, a communication link is a fundamental unit for composing large complex systems that must communicate with each other. A communication bus also provides for versatility of a system. A properly configured bus can provide for the easy addition or subtraction of units on the bus. Also, a communication bus provides for a low cost communication system. By dedicating a predetermined set of shared wires to use as a communication bus, many units that need to communicate with each other do not themselves need to dedicate other sets of wires amongst all the various units.

Although a communications bus provides advantages, there are limits. A communications bus has an associated maximum bandwidth for communicating information. Also, a communications bus cannot be simultaneously shared with all the units on the bus. Thus, communications bottlenecks can occur where the units on the bus compete for access to the bus. The maximum speed of a bus can be limited by such factors as the length of the bus, the number of units on the bus, and the need to support a range of devices. The configuration of a bus can be complicated by the range of devices with greatly different characteristics such as varying latencies, that is the time required to respond to a command, and varying data transfer rates. When the transmission rate of a unit is faster than the transfer rate of the bus, the bus may need to moderate how data is placed on the bus. Also, when the receive rate is slower than the transfer rate of the bus, the bus may again need to moderate how data is placed on the bus.

Prior art synchronous communications buses also suffer in performance because the operation of an initiator unit and a target unit are necessarily closely coupled. The initiator unit needs to continually have an indication of certain of the target units operations. Similarly, the target unit needs to continually have an indication of certain of the initiator units operations. While this provides for a closely controlled communications bus, it also introduces much lag, in particular, round-trip lag. For example, in executing a write operation, signals need to be generated by an initiator, directed to the target, processed by the target, a different signal needs to be generated by the target, the new signal is then directed to the initiator to initiate the desired write operation. In a sense, signals need to loop from the initiator, to the target, and back to the initiator. A read operation introduces a second round trip delay that also needs to be negotiated. Other aspects of the prior art will be discussed in conjunction with the description of the present invention below. To fully understand the present invention, it is very useful to first understand certain aspects of the prior art. Accordingly, the prior art is first reviewed; thereafter, embodiments of the present invention are described. With a full understanding of the prior art, the broad application of the present invention can be better appreciated. Moreover, one of skill in the art will understand the applicability of the present invention beyond the embodiments described herein.

General aspects of a communications bus can be understood with reference to FIG. 1. Shown in FIG. 1 is the organization of a communications bus 102. Communications bus 102 includes a first set of wires dedicated as control lines 104 and a second set of wires dedicated as data lines 106. Control lines 104 control the flow of information on communications bus 102 and in particular data on data lines 106. Among other things, information on control line 104 can indicate what type of information is on data lines 106. Information on control line 104 can further indicate the direction of the flow of information on data lines 106 including the source and destination of information. Data lines 106 carry information between a source and a destination. Such information can include an address indicating the destination of the data. Moreover, information on data lines 106 can carry complex commands to be received and processed by a destination unit.

When communicating or exchanging information, a bus transaction occurs. Generally, a bus transaction includes a request that issues a command, and an action that includes transferring the data. Shown in FIG. 2 is a block diagram of a communications system 200 that includes a bus master 202 a communications bus 204 and a bus slave 206. Bus master 202 is the unit that initiates a bus transaction by issuing a command and/or an address to be communicated over bus 204 and to be received by bus slave 206. After receipt of such command and/or address and when it is prepared to respond to the command and/or address, bus slave 206 responds by sending data to the master if the master had asked for data. In this manner, bus master 202 can read data from bus slave 206, that is, bus slave 206 transmits read data over communications bus 204. Bus slave 206 can also respond by receiving data from bus master 202 if bus master 202 had indicated a write operation. In this manner, bus master 202 can write data to bus slave 206 by transmitting information over communications bus 204.

There are various types of buses including processor/memory buses, backplane buses, input/output buses, and inter-block buses, including buses between blocks in an integrated circuit. Shown in FIG. 3A is a block diagram of computer system 300 that makes use of processor/memory bus 302, backplane bus 304 and I/O buses 306A and 306B. As shown, processor/memory bus 302 is a high speed bus for communicating information between processor 308 and memory 310. Because I/O devices 312 through 318 may also need to access processor 308 or memory 310, backplane bus 304 and I/O buses 306A and 306B are also provided in conjunction with bus adaptors 320A, 320B and 320C. Bus adaptor 320A is provided as an interface between processor/memory bus 302 and backplane bus 304. Bus adaptor 320A provides any necessary conversion between processor/ memory bus 302 and backplane bus 304. Similarly, bus adaptors 320B and 320C provide any necessary conversion between backplane bus 304 and I/O buses 306A and 306B, respectively. By decoupling backplane bus 304 and I/O buses 306A and 306B, loading on processor memory bus 302 is greatly reduced. Shown in FIG. 3B is a block diagram of an integrated circuit 350 having various blocks 352A through 352D that are communicatively coupled to inter-block bus 354. Just as communications buses can be provided externally to an integrated circuit, inter-block bus 354 provides for bused communications within an integrated circuit 350. Although the scale may be different, the fundamental purpose of all these buses is the same-to communicate information from a source to a destination.

When communicating data, in general, or when communicating data on a communications bus, in particular, there necessarily has to be a transmitter of information and a receiver of information. In certain contexts, the transmitter and receiver can also be referred to as a source of information and a destination of information. Also, when discussing communications buses, master and slave units are sometimes used, where the slave unit is subservient to the master unit. The slave unit performs the actions requested by the master unit. In many situations, these roles are never changed; that is, a master unit is always a master unit and a slave unit is always a slave unit. In other configurations, however, units may be interchangeably masters or slaves. In such configurations, it is more convenient to refer to an initiator unit and a target unit. An initiator unit is therefore similar to a master-type unit in that it directs another unit to perform certain actions. An initiator unit may have the further functionality that it may operate as a slave-type unit in another situation. Because the present invention has wide applicability, the terms initiator and target units will be used, however, one of skill in the art will understand the present disclosures applicability to master and slave unit configurations and source and destination configurations.

In a communications bus configuration where there are multiple potential initiator units, there is a need for bus arbitration to control bus accesses; an arbiter unit performs this function. A bus transaction, therefore, includes steps for performing arbitration, requests, and executing the requested action. An initiator unit requiring use of a communications bus asserts a bus request but cannot use the bus unit until its bus request is granted by the arbiter. When granted access to the bus, the initiator unit proceeds to use the communications bus as necessary. Also, the initiator unit must signal to the arbiter unit that it is finished using the communications bus. The arbiter unit can then grant access to other initiator units as necessary. Many arbitration schemes are widely known in the art and include, for example, daisy chain arbitration, centralized parallel arbitration, and distributed arbitration.

With a general understanding of a communications bus, we now turn to protocols used in a communications bus. Shown in FIG. 4A is timing diagram 400 illustrating a prior art synchronous bus transfer protocol for writing information from an initiator unit to a target unit. Because it is a synchronous protocol, the initiator unit and the target unit operate based on a synchronized master clock 402. Note that in the proceeding discussion, any logic diagrams or logic devices are described as active-low logic level devices. One of skill in the art will understand, however, that active-high devices can also be used. In a situation where an initiator unit writes data to a target unit, the initiator unit prepares the write data WR_DATA 404 and the write address WR_ADDR 406. When such information is ready, shown as Addr0 and Data0 at time t0 408, the initiator unit provides a bus write request WR_REQ_B 410 as an active-low signal. At the next clock cycle, shown as t1 415, the target unit receives WR_REQ_B 410 and processes such request. When the target is ready to receive address and data information, the target unit activates a bus grant GNT_B 412 at time t2 414. At the next master clock cycle, shown as time t3 416, the first address Addr0 and the first data data0 are written to the target. Note that Addr0 and Data0 are depicted as being written at some small time after t3 416. This is done to illustrate any lag in processing or propagation through logic circuits. Such a lag can become quite significant when there are small clock cycles or where the propagation delay is long. Indeed, where such a lag exceeds the period of one clock cycle, a communications bus can exhibit significant errors that affects its operation or the operation of the communicatively coupled devices.

After Addr0 and Data0 are processed, subsequent address and data information, such as Addr1 through Addr3 and Data1 through Data3, can similarly be transmitted (for example, at times t5 420, t7 424, and t4 418). After a write request is complete, an initiator unit de-asserts bus write request WR_REQ_B 410 a short time after time t4 418; this short time is associated with a lag in processing or propagation through combinational logic. The target unit then responds by de-asserting the bus grant GNT_B 412. The bus is then made available for other use.

It should be noted that when receiving data, the target unit may periodically remove the bus grant signal to slow its receipt of information. In this way, the target unit can process any received information, prior to receiving more information. For example, at time t5 420, the target unit removes bus grant signal GNT_B 412 such that Addr2 and Data2 are not received by the target unit at time t6 422, but are instead received at time t7 424 after the bus grant signal GNT_B 412 is re-activated.

Shown in FIG. 4B is timing diagram 450 illustrating a prior art synchronous protocol for an initiator reading information from a target unit. Because it is a synchronous protocol, the initiator unit and the target unit operate based on master clock 452. In a situation where an initiator unit reads data from a target unit, the initiator unit first prepares the read address RD_ADDR 456. When such information is ready, shown as Addr0 at time t0 458, the initiator unit activates a bus read request RD_REQ_B 460. Sometime thereafter (note that lags are again illustrated for similar reasons as with FIG. 4B), at time t1 463, the target unit receives RD_REQ_B 460 and processes the request. When the target unit is ready to receive address information, the target unit asserts a bus grant GNT_B 462 at time t2 464. At the next clock 452 cycle, shown as time t3 466, the first address Addr0 is received by the target; the target unit can also receive subsequent address information such as Addr1 through Addr3. It should be noted that when reading address information, the target unit may periodically remove the bus grant GNT_B 462 signal to throttle when it reads address information from the initiator unit. In this way, the target unit signals the initiator unit when to provide the next item of address information. For example, at time t8 482, GNT_B 454 is de-activated thereby preventing the next address, Addr2, from being read. At time t5 472, however, GNT_B 454 is re-activated thereby indicating that Addr2 can be read. With regard to data that is to be read by the initiator, the target unit must first process and retrieve such data. For example, the target unit must process and retrieve Data0 associated with Addr0 and similarly, for other addresses. A read operation can take several clock cycles depending on whether any page breaks are required in a memory being accessed and also depending on the lag of a system. When RD_DATA 474 contains at least the first data to be read (i.e., Data0 at time t4 468), the target unit responsively asserts a read data ready signal RD_DATA_RDY_B 470. Data0 is placed on the bus at the next clock cycle, time t5 472. Subsequent read data information, such as Data1 through Data3, is similarly transmitted.

After a read request is complete, that is, when a target has received all the read address information, an initiator unit can de-assert bus read request RD_REQ_B 460 at time t6 472. The target unit then responds by de-asserting the bus grant GNT_B 454. When the target unit has completed providing all the read data information (i.e., Data0 through Data3) at time t9 784, it signals the initiator unit by asserting RD_DATA_RDY_B 470. The bus is then made available for other use. It should be noted that when reading data, the target unit may periodically remove the read data ready signal, RD_DATA_RDY_B signal 470 to throttle when it provides read information to the initiator unit. In this way, the target unit signals the initiator unit when information is being placed on the bus. For example, at time t6 478, RD_DATA_RDY_B 470 is de-asserted thereby preventing the next data, Data1, from being read. At time t7 480, however, RD_DATA_RDY_B 470 is re-asserted thereby indicating that Data1 can be read. In a situation where the communications bus stalls, a stall signal STALL_RD_DATA_B 476 is asserted thereby indicating that further data cannot be read. For example, at time t8 482, STALL_RD_DATA_B 476 is asserted such that Data2 is not placed on the communications bus. At time t9 484, however, where STALL_RD_DATA_B 476 is de-asserted, the next data, Data 2, is placed on the communications bus.

The bus transfer protocol illustrated in FIGS. 4A and 4B can be implemented in many different forms. Shown in FIG. 5 is an exemplary block diagram of communication system 500 that implements the protocol of FIGS. 4A and 4B. FIG. 5 depicts various components contained within initiator unit 502 and target unit 504 where the various blocks in communication bus 500 can be implemented as combinational logic or in other forms known in the art. As shown, initiator unit 502 is communicatively coupled to target unit 504 through communications bus 506. Within initiator unit 502 is Initiator Handshake State Machine 508 that receives signals 510 from within initiator unit 502 to determine whether a write or read operation over communications bus 506 will be necessary. If so, request generating unit 512 generates signal 514 as a logic level low WR_REQ_B or RD_REQ_B signal indicating a write request or a read request, respectively. Signal 514 is coupled to communications bus 506 and directed to target unit 504. Target unit 504 receives and processes request signal 514 at Target Handshaking State Machine 516. Responsive to signals 518 internal to target unit 504, Target Handshake State Machine 516 determines if or when it is available to process the initiator unit's request. If target unit 504 is available, Request Generating unit 520 generates signal 522 as a logic level low signal indicating that it is available. Signal 522 is directed to OR gate 524; OR gate 524 also receives request signal 514. Accordingly, both signal 514 and signal 522 must be a logic level low for the output signal of OR gate 524 to be a logic level low (recall, active level low devices are in use); the output of OR gate 524 is therefore grant bus request GNT_B signal 526. GNT_B signal 526 is directed to Initiator Handshake State Machine 508 and Initiator Request Generating Unit 510 to update such units on the status of communications bus 506. GNT_B signal 526 is then directed to Address Unit 526 and Address Unit 526 and Write Unit 527. More particularly, GNT_B signal 526 is directed to multiplexer 528 of Address Unit 526 and multiplexer 529 of Write Unit 527. Address Unit 526 is used for addressing functions in both write and read operations. Write Unit 527 is used for writing data from initiator unit 502 to target unit 504 over communications bus 506.

Prior to having received GNT_B signal 526, Address Unit 526 makes available a first Address at ADDR signal 530 by means of Address/Counter 534 and multiplexer 528. ADDR signal 530 can be a write address or a read address. Through the operation of multiplexer 528 and D Flip-Flop 532, the first address is continually written and re-written at every clock cycle to signal line 530 while GNT_B signal 526 is at logic level high. When GNT_B signal 526 becomes an active logic level low, target unit 504 receives the first address at ADDR signal 530. Subsequently and responsive to ADDR signal 530, Address/Counter 534 provides further address information through Multiplexer 528, through D Flip-Flop 532 and to ADDR signal 530. Target unit 504 can then receive further address information. Address/Counter Unit 534 receives signals 536 from within initiator unit 502 to determine appropriate address. Importantly, Address Unit 526 operates similarly for write and read operations.

In a write operation, Write Unit 527 is utilized. Prior to receiving an active level low GNT_B signal 526, Write Unit 527 makes available the first write data at WR_DATA signal 538. Through the operation of Multiplexer 529 and D Flip-Flop 540, the first write data was continually written and re-written at every clock cycle to WR_DATA signal 538 while GNT_B signal 526 was at logic level high (i.e., not active). When GNT_B signal 526 becomes logic level low (i.e., active), target unit 504 receives the first data at WR_DATA signal 538. Subsequently and responsive to WR_DATA signal 538, Write Data FIFO 544/FIFO Controller 546 provides further data through multiplexer 529, through D Flip-Flop 540 and to WR_DATA 538. Target Unit 504 can then receive further data corresponding to the received address information as discussed above. Write Data FIFO 544 is also coupled to signal lines 546 to receive appropriate data information from within initiator unit 502.

In a read operation, Read Unit 548 is utilized. Target unit 504, and in particular Read Unit 548, must have available at least the first addressed data (i.e., Data0), where the corresponding address (i.e., Addr0) was transmitted in the manner described with reference to Address Unit 526. With the first address information, Read Unit 548 can retrieve such addressed information, for example, from a memory, and provide it to Data FIFO 550 through signals 574. Multiplexer 552 operates similarly to the Multiplexers 528 and 529; and D Flip-Flop 554 operates similarly to D Flip-Flops 532 and 540 previously described. With Next_Data signal 556 at a logic level low and with the first read data available at Data FIFO 550, the first read data is continually provided at Read Data signal line 558. When FIFO Control and Data Output Control Unit 560 determines that target unit 504 is ready to provide the requested read data, FIFO Control and Data Output Control Unit 560 responsively provides Next_Data signal 556 to Multiplexer 552 and RD_DATA_RDY_B signal 564 to Initiator Unit 502, and in particular, FIFO Control and Data Latch Control Unit 566. With Next_Data signal 556 at a logic level low, the second and subsequent data is passed from Data FIFO 550, through Multiplexer 552, through D Flip-Flop 554, to Initiator Unit 502, and in particular Read Data FIFO 568. When at Read Data FIFO 568, read data can be distributed to initiator unit 502 through signal 570. FIFO Control and Data Latch Control Unit 566 provides further functionality by generating a bus read stall STALL_RD_DATA_B signal 572 to target unit 504, and in particular, FIFO Control and Data Output Control Unit 560. With such a STALL_RD_DATA_B signal 572 active, FIFO Control and Data Output Control Unit 560 makes NEXT_DATA signal 562 logic level high so as to throttle the data being passed through communications bus 506.

The prior art communications bus described with reference to FIGS. 4A, 4B and 5 suffers from certain disadvantages. For example, such a prior art system necessarily couples the operation of the initiator and target units. The initiator unit needs to continually have an indication of certain of the target units' operations. Similarly, the target unit needs to continually have an indication of certain of the initiator units operations. While this provides for a closely controlled communications bus, it also introduces much lag, in particular, round-trip lag. For example, in executing a write operation, signals needs to be generated by an initiator, directed to the target, processed by the target, a different signal needs to be generated by the target, the new signal is then directed to the initiator to initiate the desired write operation. In a sense, signals need to loop from the initiator, to the target, and back to the initiator. A read operation introduces a second round trip delay that also needs to be negotiated.

A further disadvantage is that a request signal (i.e., RD_REQ_B or WR_REQ_B) and a grant signal (i.e., GNT_B) have to be activated in a same clock cycle, which potentially causes read or write failures due to the roundtrip lag discussed above. Moreover, the grant signal from the target unit controls many logic functions within the initiator unit, but the processing of the grant signal at the initiator unit needs to be moderated so as to avoid long propagation delays. This, however, may not allow for proper or complete processing of the grant command. For example, a complex, but desirable feature at the initiator unit may need to be avoided because it cannot be processed in a short enough time.

Another problem with the prior art is that addresses have to be incremented at every clock cycle. But when the clock frequency is very high, processing of the address count cannot be completed in one clock cycle. A very high clock frequency can cause other problems both within the initiator unit and the target unit as certain processing may not be accomplished in one clock cycle. When this occurs, the wrong data may be present at the next clock frequency, thus causing an error condition.

The present invention, by decoupling the request and grant signals provides advantages over the prior art.

SUMMARY OF THE INVENTION

The present invention provides for an improved bus transfer protocol that effectively decouples an initiator and a target unit in a digital communications bus. A method, in accordance with the present invention, of performing a data transfer from an initiator unit to a target unit over a bus interconnecting the initiator unit and target units includes providing a starting write address and write length information on the bus synchronously with a clock signal. While the starting write address and write length information are present on the bus, a write request signal is provided. The write request signal is activated and deactivated synchronously with a clock cycle of the clock signal. A grant signal is then received from the target unit, the grant signals being activated and deactivated synchronously with a clock cycle of the clock signal. After the grant signal is deactivated, a number of write data items is provided on the bus synchronously with the clock for capture by the target unit, one data item being provided in each clock cycle of the clock signal, the number of data items being determined by the write length information provided.

The present invention further provides a complementary method for reading information from a target unit to an initiator unit. First, a starting read address and read length information are provided on the bus synchronously with a clock signal. While the starting read address and read length information are present on the bus, a read request signal is provided. The read request signal is activated and deactivated synchronously with a clock cycle of the clock signal. Next, a grant signal is received from the from the target unit. The grant signal is activated and deactivated synchronously with a clock cycle of the clock signal. After the grant signal is deactivated, a block ready signal is received from the target unit, and a number of read data items is captured on the bus synchronously with the clock signal, one read data item being provided in each clock cycle of the clock signal, the number of read data items being determined by the read length information provided.

An apparatus in accordance with the present invention includes an initiator unit or a target unit. The initiator unit includes a request generating unit, a handshake state machine, an address counter, a write data FIFO and write FIFO controller, and a read data FIFO and read FIFO controller. The request generating unit is coupled to receive an operation type indicator and configured to activate, in response to the operation type indicator, a read or write request signal on a communication bus. The read or write request signal is synchronous to a clock signal. The handshake state machine is coupled to the request generating unit to provide the operation type indicator. The handshake state machine is coupled to the communication bus to receive a grant signal and provide, in response to an active grant signal, an active next block signal. The address counter is coupled to the handshake state machine to receive the next block signal and is configured to synchronously provide, in response to an active next block signal, an address at which either the read or write operation is to start and a length indicating a number of data items to be transferred over the communications bus in the operation. The write data FIFO and write FIFO controller is coupled to the handshake state machine to receive the next block signal and is configured to synchronously provide, in response to an active next block signal, the number of data items on the communications bus in a write operation. The read data FIFO and read FIFO controller is coupled to receive the number of read data items on the communications bus in a read operation and a read block read signal from the communications bus and to provide to the communications bus an accept next block signal.

The target unit includes a handshake state machine, a request generating unit, and a data FIFO and FIFO controller. The handshake state machine is coupled to receive a read or write request signal from a communications bus and a unit available signal. The read or write request signal is synchronous to a clock signal. The request generating unit is coupled to the handshake state machine to receive an unit available indicator and is coupled to the communications bus to provide a grant signal. The grant signal is synchronously activated in response to an active read or write request signal and an active unit available signal. The data FIFO and FIFO controller is configured to synchronously provide a pre-specified number of read data items or write data items and a read block ready signal to the communications bus and to receive a accept next block signal from the bus.

One advantage of the present invention, is that data is transferred in pre-defined blocks.

Another advantage is that addresses for each data item are not required to be transferred on the bus.

Yet another advantage is that the overall time to transfer a block of data between the initiator and the target is reduced, because there is no requirement to leave the request signal active awaiting an active grant signal and because there is no requirement to maintain the address and length information on the bus for more than one clock cycle.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

Figure 1:
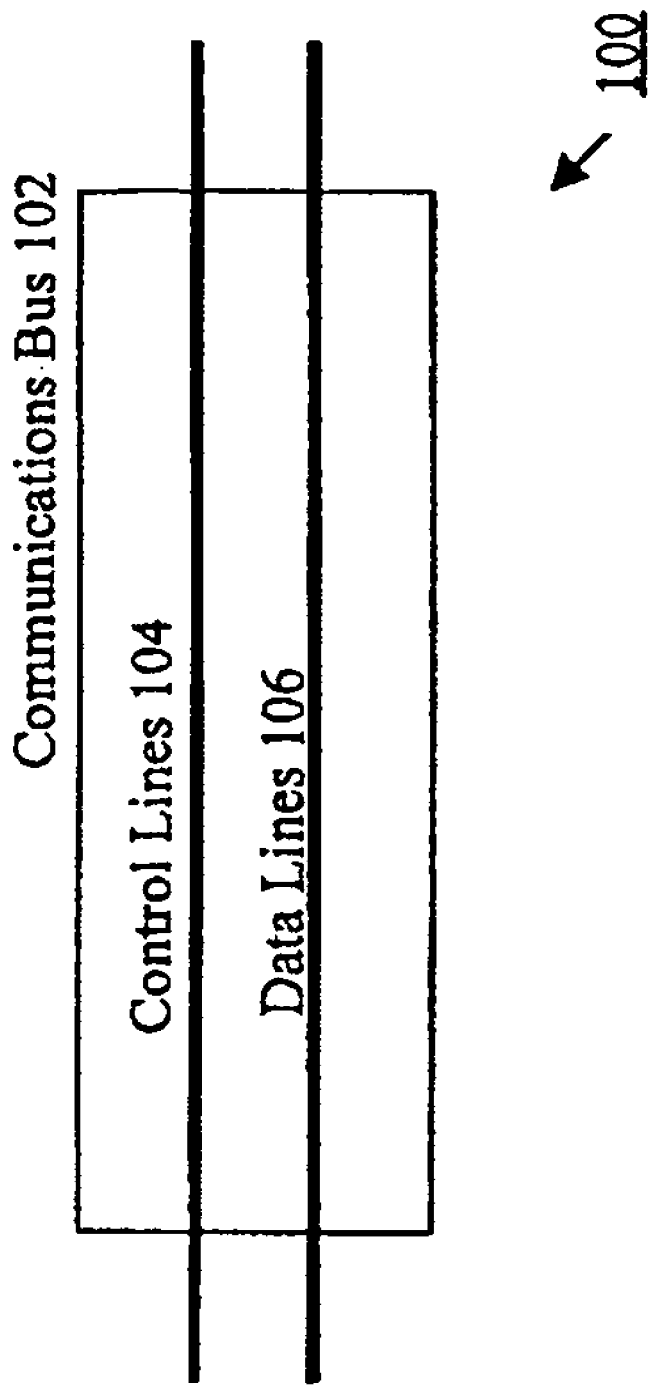
FIG. 1 is a block diagram depicting the general organization of a communications bus according to the prior art.
Figure 2:
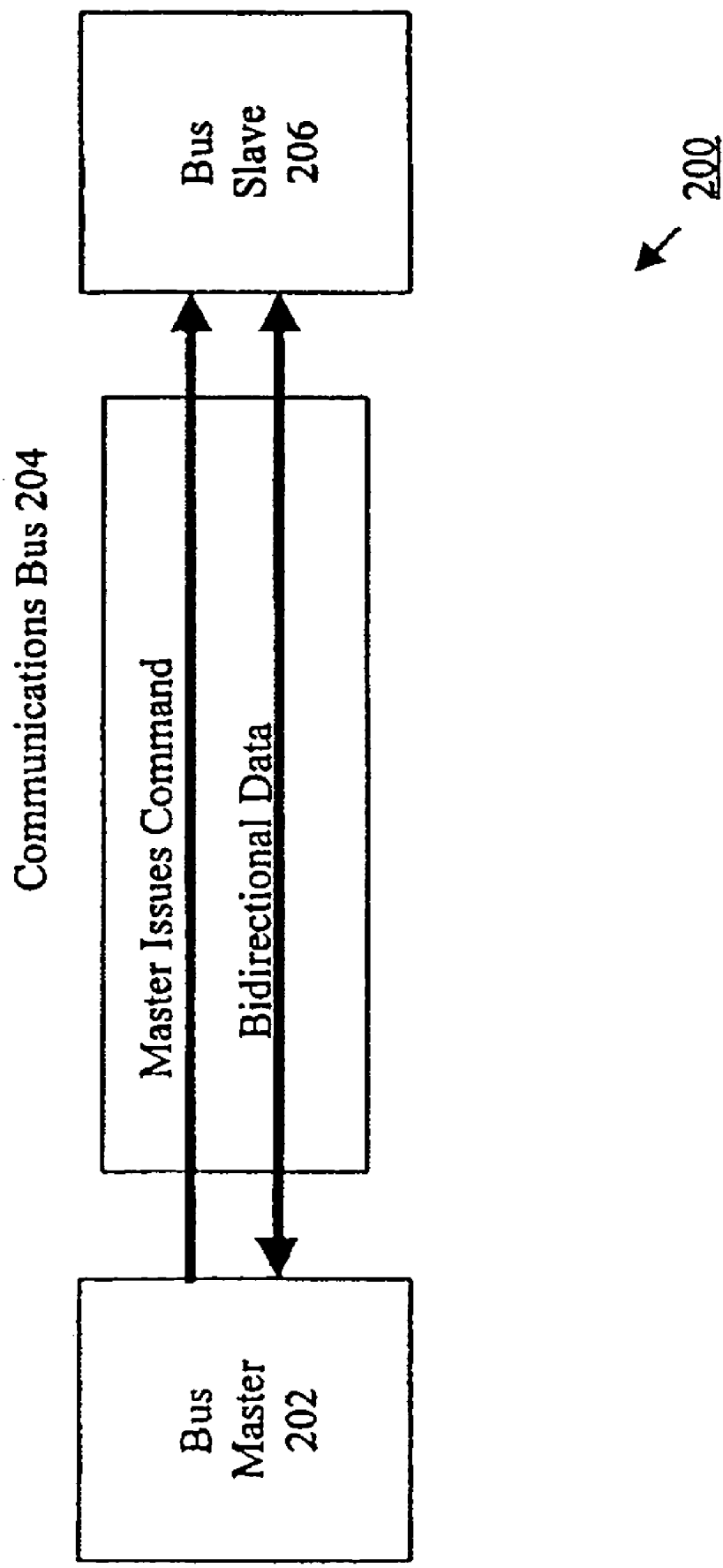
FIG. 2 is a block diagram of a communications bus in a master-slave configuration according to the prior art.
Figure 3A:
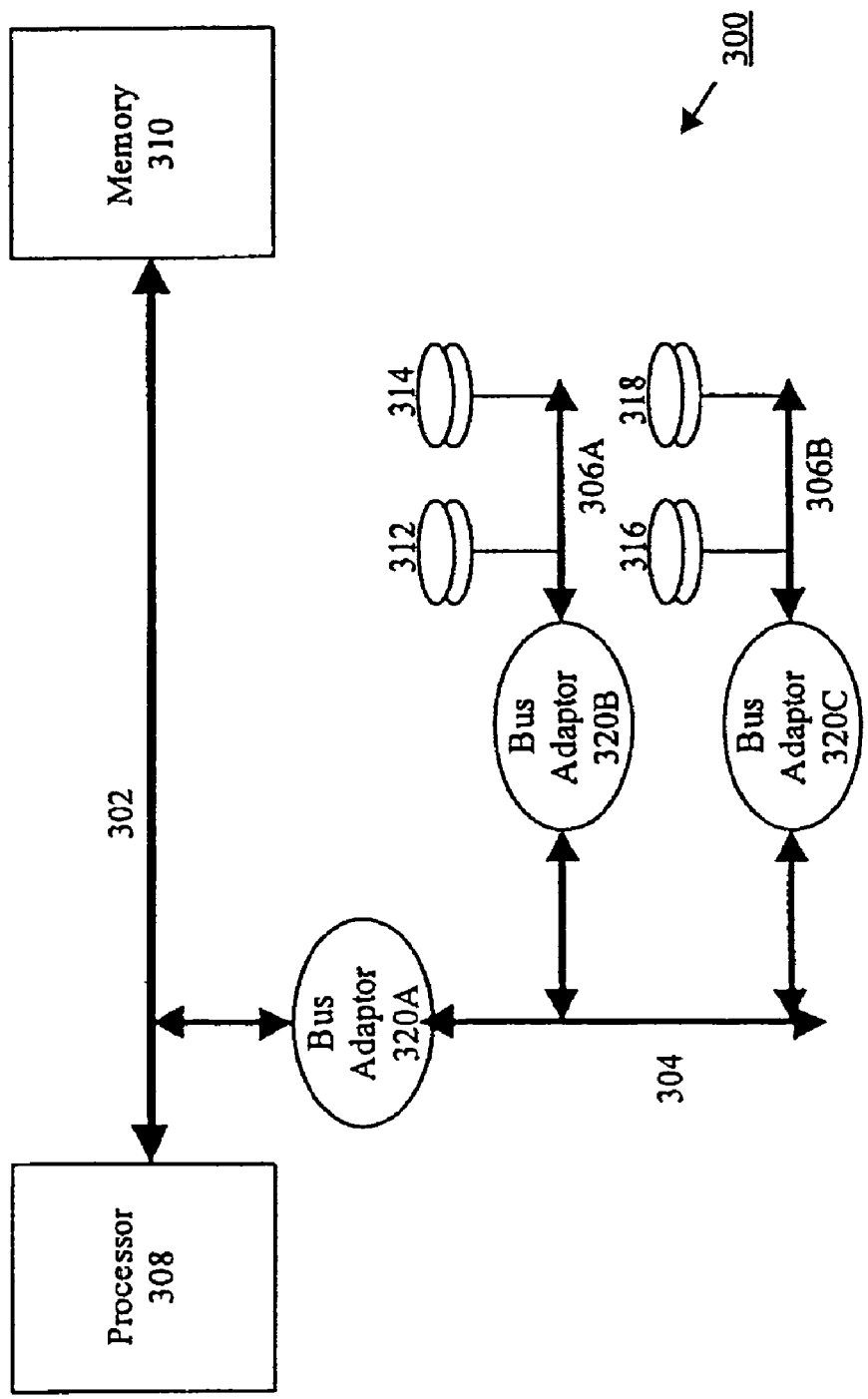
FIG. 3A is a block diagram of a computer system that makes use of various busses including a processor/memory bus, a backplane bus and an input/output bus according to the prior art.
Figure 3B:
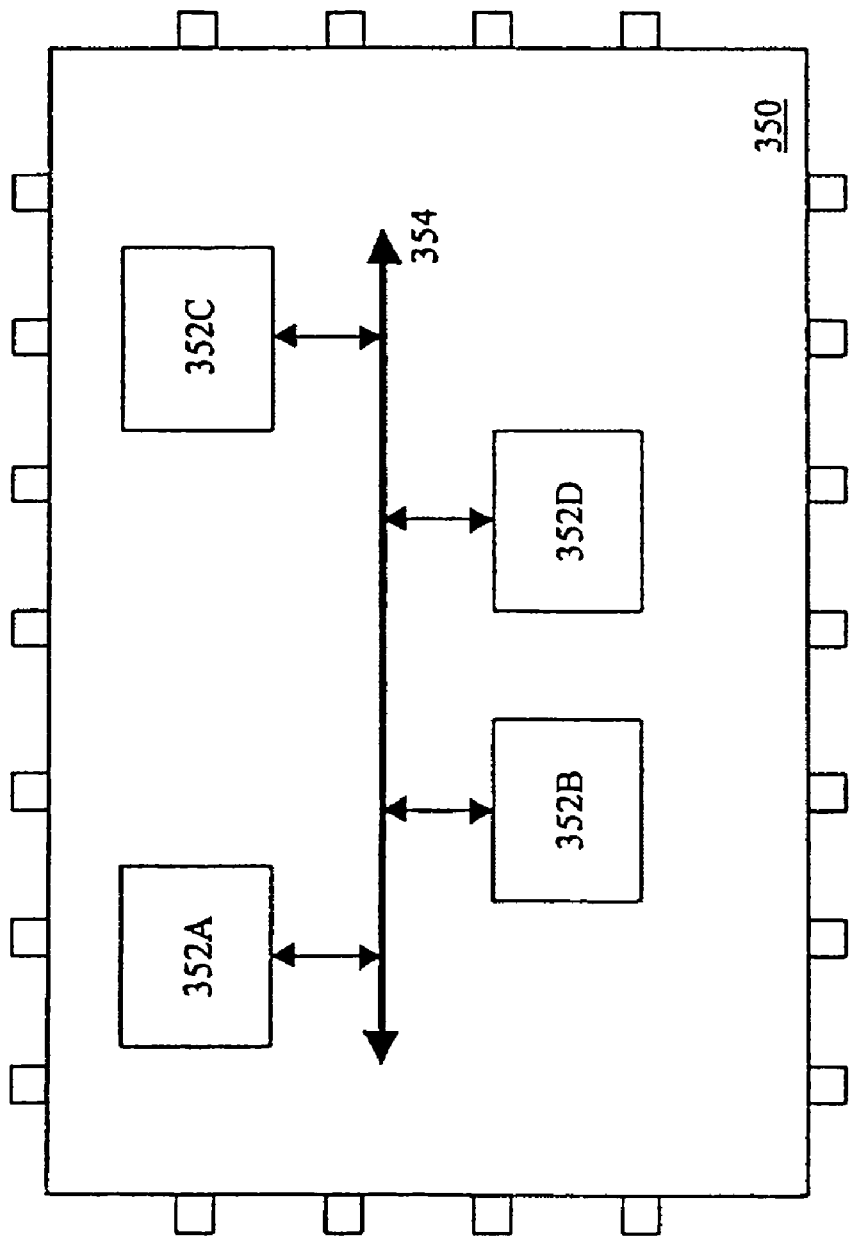
FIG. 3B is a block diagram of an integrated circuit having various blocks of circuitry and an interblock communications bus according to the prior art.
Figure 4A:
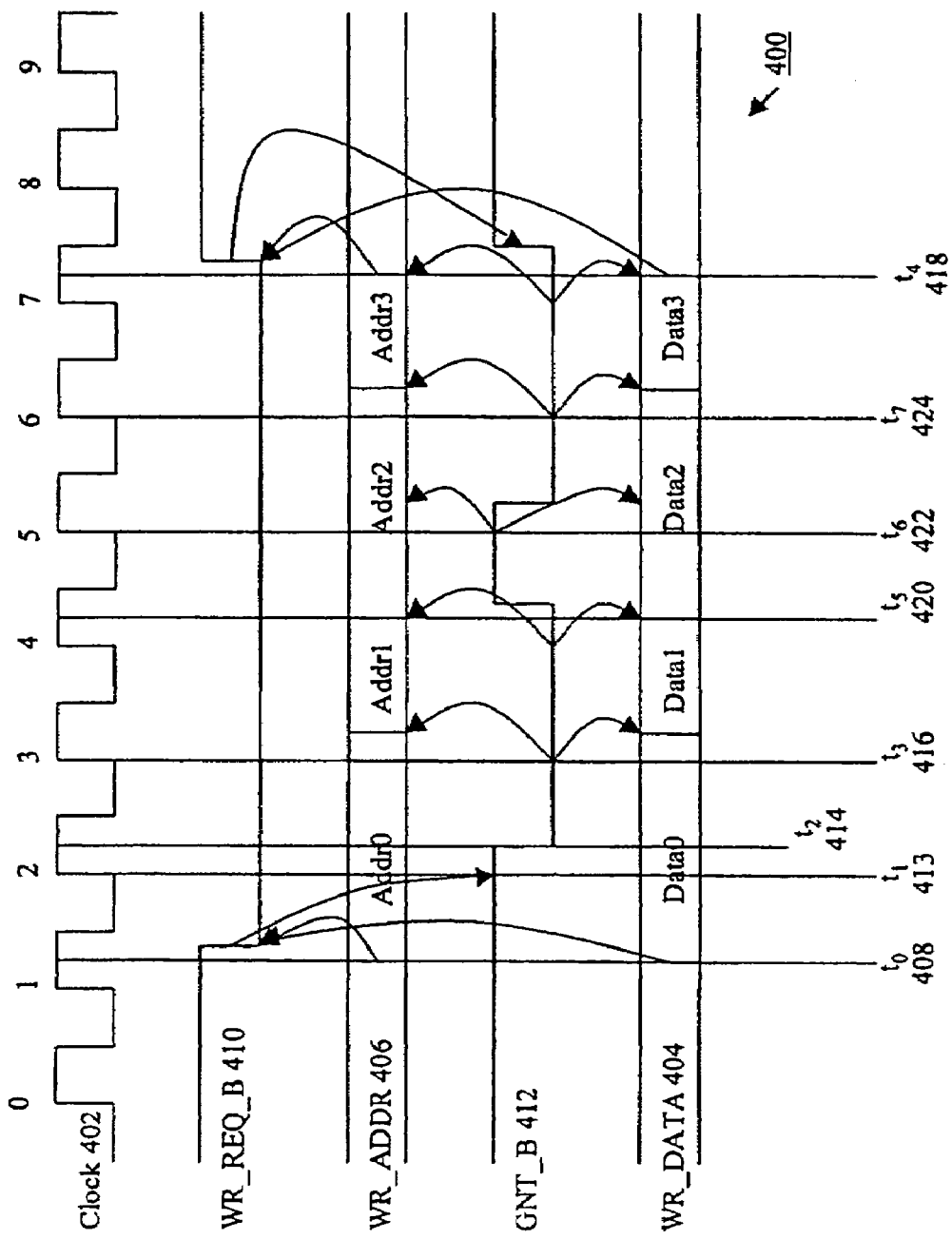
FIG. 4A depicts a timing diagram depicting the interaction of various signals used to effect a write operation in a synchronous communications bus protocol according to the prior art.
Figure 4B:
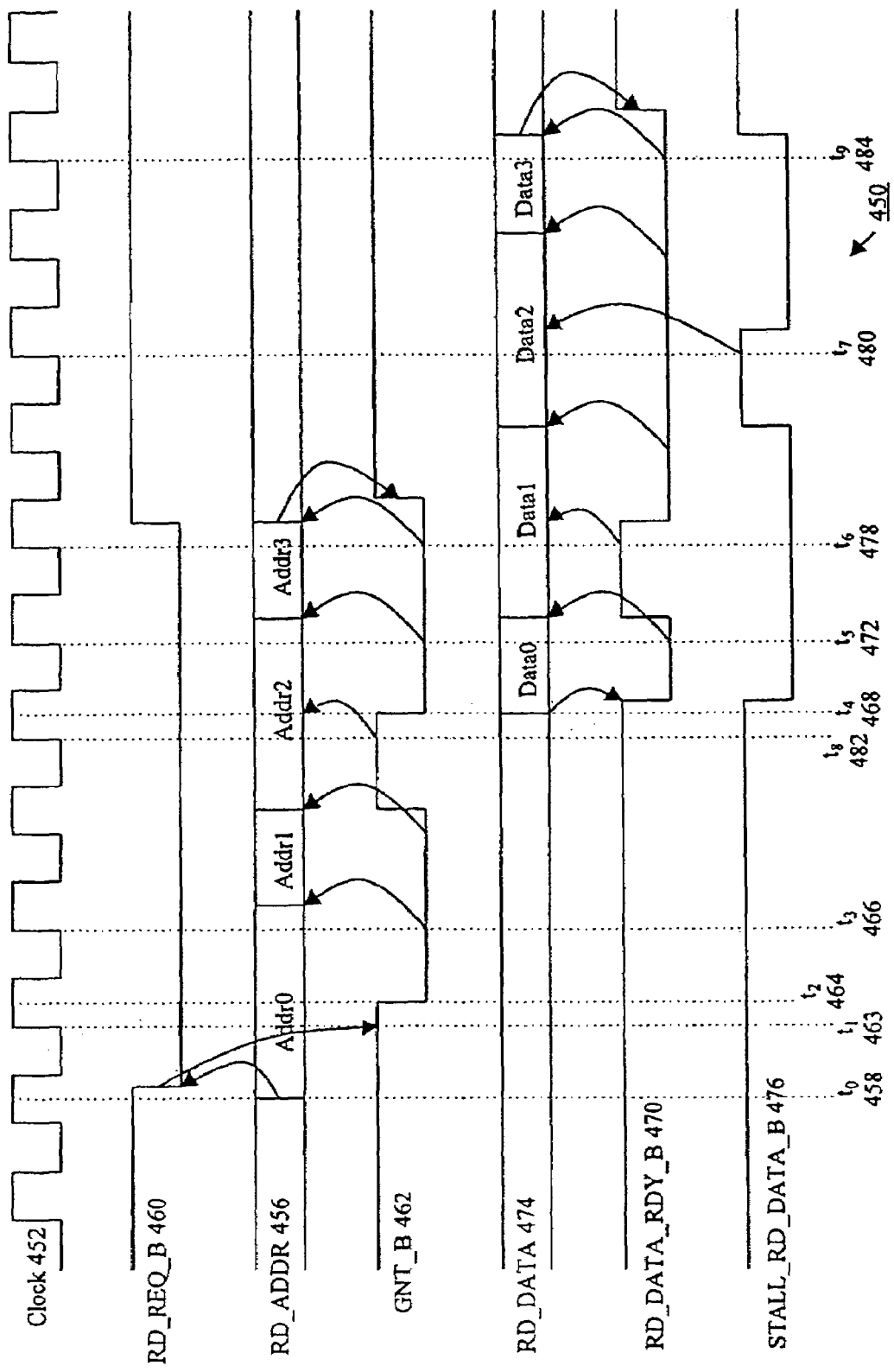
FIG. 4B depicts a timing diagram depicting the interaction of various signals used to effect a read operation in a synchronous communications bus protocol according to the prior art.
Figure 5:
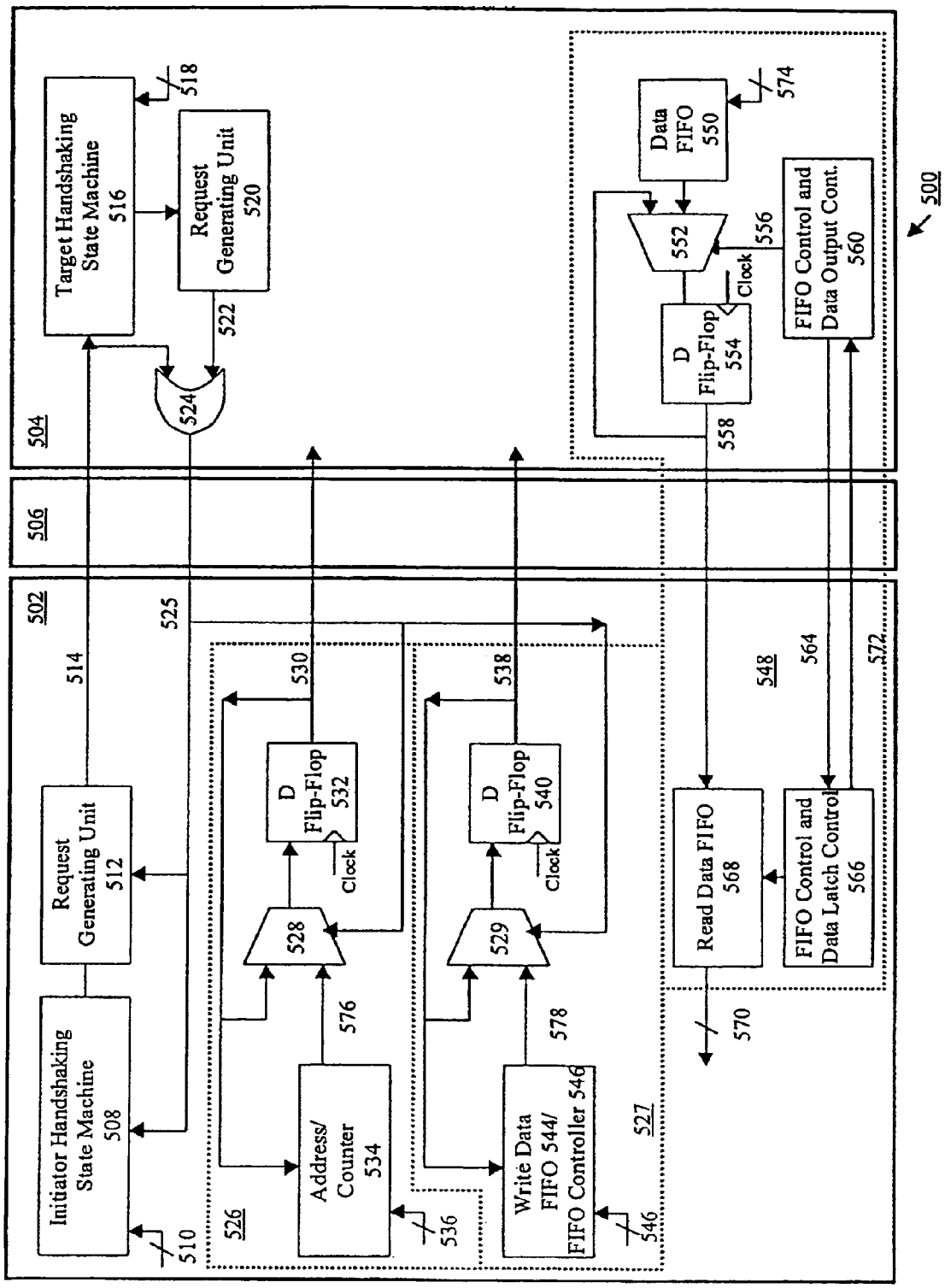
FIG. 5 is a block diagram of a communications system having an initiator unit, a communications bus, and a target unit according to the prior art.
Figure 6:
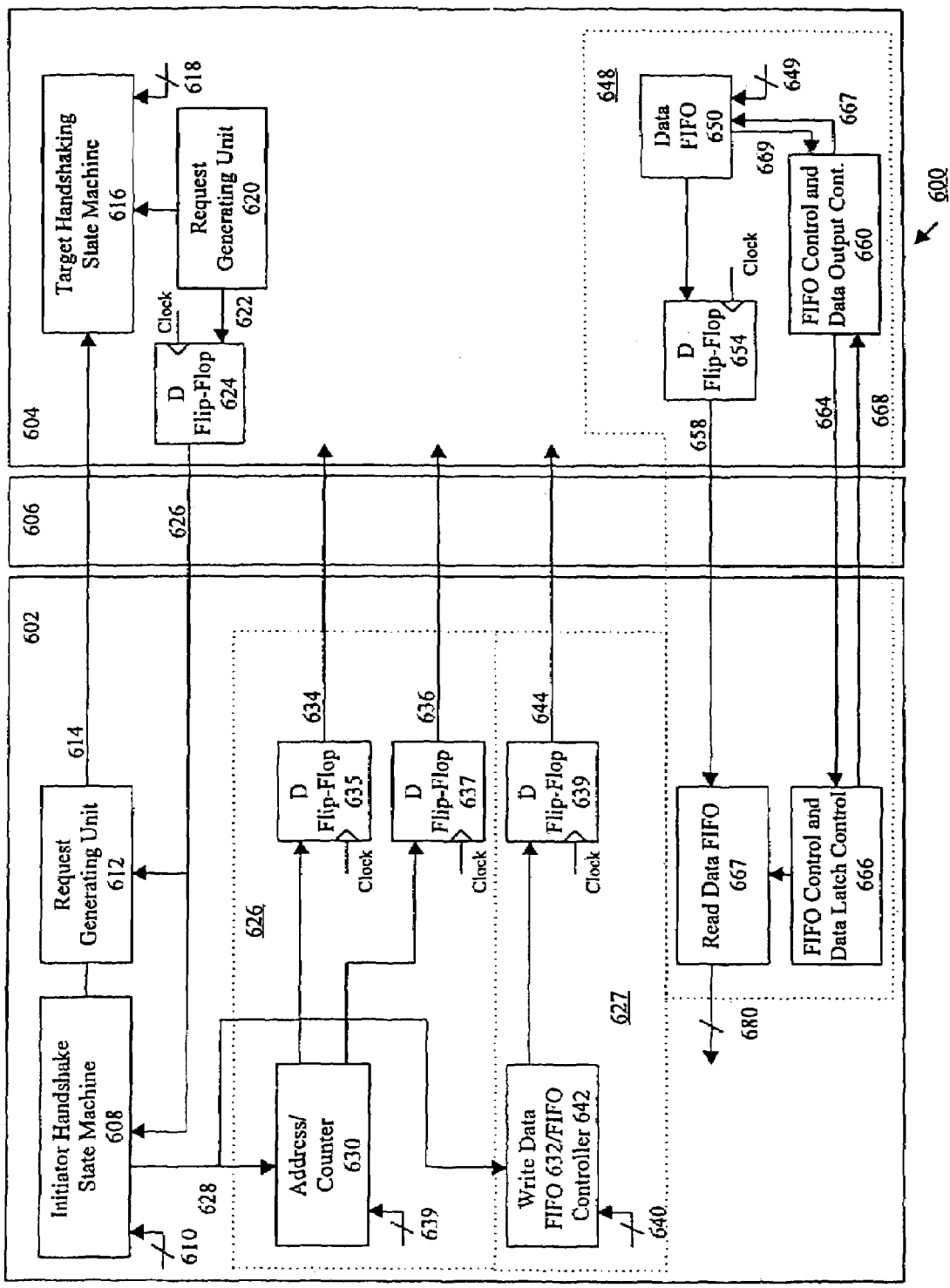
FIG. 6 is a block diagram of a communications system having an initiator unit, a communications bus, and a target unit according to the present invention.

Shown in FIG. 6 is a block diagram of a communication system 600 depicting various components contained within an initiator unit 602 and a target unit 604 in accordance with an embodiment of the present invention. A bus transfer protocol used by communication system 600 is further described with regard to timing diagrams 700 and 750 of FIGS. 7A and 7B and with regard to flowcharts 800 and 850 of FIGS. 8A and 8B. As shown in FIG. 6, an initiator unit 602 is communicatively coupled to target unit 604 through a communications bus 606 according to the present invention. Included within the initiator unit 602 is Initiator Handshake State Machine 608 that receives signals 610 from within initiator unit 602 to determine whether a write or read operation over the communications bus 606 is needed. If so, the request generating unit 612 activates a request signal 614 WR_REQ_B or RD_REQ_B to indicate a write request or a read request, respectively. The request signal 614 is coupled to communications bus 606 and directed to target unit 604. Target unit 604 then receives and processes the request signal 614 at Target Handshaking State Machine 616. Responsive to signals 618 internal to target unit 604, the Target Handshake State Machine 616 determines if or when it is available to process the initiator request 614. Importantly, Request Generating Unit 612 need only generate a request signal 614 for only one clock cycle because the Target Handshaking State Machine 616 only needs such information for one clock cycle. If the target unit 604 is available, the Request Generating unit 620 activates a signal 622 indicating that it is available. The signal 622 is directed to a D Flip-Flop 624. The D Flip-Flop 624 activates a grant bus request GNT_B signal 626 which is directed to Initiator Handshake State Machine 608 and Initiator Request Generating Unit 612 to update these units on the status of communications bus 606. Importantly, GNT_B signal 626 need only be generated for one clock cycle as Initiator Handshaking State Machine 608 and Request Generating Unit 612 needs such information for only one clock cycle.

Responsive to the GNT_B signal 626, the Initiator Handshake State Machine 608 activates a NEXT_BLOCK signal 628 that is directed to Block Address Unit 626 and Write Unit 627. More particularly, NEXT_BLOCK signal 628 is directed to Address Generator 630 and Write Data FIFO 632. The NEXT_BLOCK signal 628 indicates that the target unit 604 is ready to receive a block of data. Such a block of data, according to the present invention, is associated with a block address (i.e., WR_ADDR or RD_ADDR) and is further associated with a length of the block of data (i.e., WR_LENGTH or RD_LENGTH).

Responsive to the NEXT_BLOCK signal 628, the Block Address Unit 626, and in particular Address/Counter 630, makes the first block address available to the D Flip-Flop 635 which, on the next clock signal, makes the block address signal 634 available to the target unit 604. Importantly, block address signal 634 needs to be made available to target unit 604 for only one clock cycle. Address/Counter 630 also determines the length of the block of data that is to be transferred in a write or read operation. Responsive to NEXT_BLOCK signal 628, Block Address Unit 626, and in particular Address/Counter 630, makes available the associated length of block of data to be transferred. Moreover, the length of the block and the block address are associated at both initiator unit 602 and target unit 604. Upon receiving NEXT_BLOCK signal 628, Address/Counter 630 makes available to the D Flip-Flop 637 the length of the block which, at the next clock signal, is made available to target unit 604 as length signal 636. Importantly, length signal 636 needs to be made available to target unit 604 for only one clock cycle. Block Address Unit 626 with its block address signal 634 and length signal 636 is used for both write and read operations.

With block address and block length information, target unit 604 then prepares to receive the identified block of write data with the specified length. Prior to receiving NEXT_BLOCK signal 628, initiator unit 602 directs information to be written to Write Data FIFO 638 through signal lines 640. Responsive to NEXT_BLOCK signal 628, Write Data FIFO 632/FIFO Controller 642 provides a first item of data to D. Flip-Flop 639 which at the next clock cycle is made available as data signal 644 (i.e., WR_DATA). Target unit 604 can then receive the first item of information that comprises the identified block of data with an associated address and length as described above. Write Data FIFO 632/FIFO Controller 642 and D Flip-Flop 639 continues to provide data at data signal 644 until the entire block of data is received.

Where a read operation is to be executed, target unit 604, and, in particular, Read Unit 648, makes available data associated with a received block address and block length, which were transmitted in the manner described above. With the block address information, Read Unit 648 retrieves the addressed information from a memory, for example, and provides it to the Data FIFO 650 and, in turn, the D Flip-Flop 654. With the data associated with the block address and block length available at the Data FIFO 650, the first item of data is provided to the D Flip-Flop 654. Simultaneously, Data FIFO 650 provides signal 669 to FIFO Control and Data Output Control Unit 660 which, in turn, generates the read block ready RD_BLOCK_DATA_RDY_B signal 664 for initiator unit 602 and, in particular, the FIFO Control and Data Latch Control Unit 666. FIFO Control and Data Latch Control Unit 666 then prepares Read Data FIFO 667 to receive the first item of the block of data. At the next clock cycle the D Flip Flop 654 provides the first item of information at the read data RD_DATA signal 658, which the initiator unit 602 is prepared to receive at the Read Data FIFO 667. The Read Data FIFO 667 then makes available the received data to initiator unit 602 through signals 680. Subsequently, FIFO Control and Data Output Control Unit 660 directs a signal 667 to Data FIFO 650 to make available the next item of data. The FIFO Control and Data Latch Control Unit 666 provides further functionality by providing an ACCEPT_NEXT_BLOCK_B signal 668 that is directed to FIFO Control and Data Output Control Unit 660 that signals Target Unit 604 that Initiator Unit 602 is ready to accept the next block of data, if a next block of data exists. Importantly, the next block of data can be transmitted by target unit 604 and received by initiator unit 602 immediately following the present block of information; no intermediate clock cycle is necessary. This can be done because Block Address Unit 626 is decoupled from Read Unit 648 so that their operations can be pipelined.

Figure 7A:
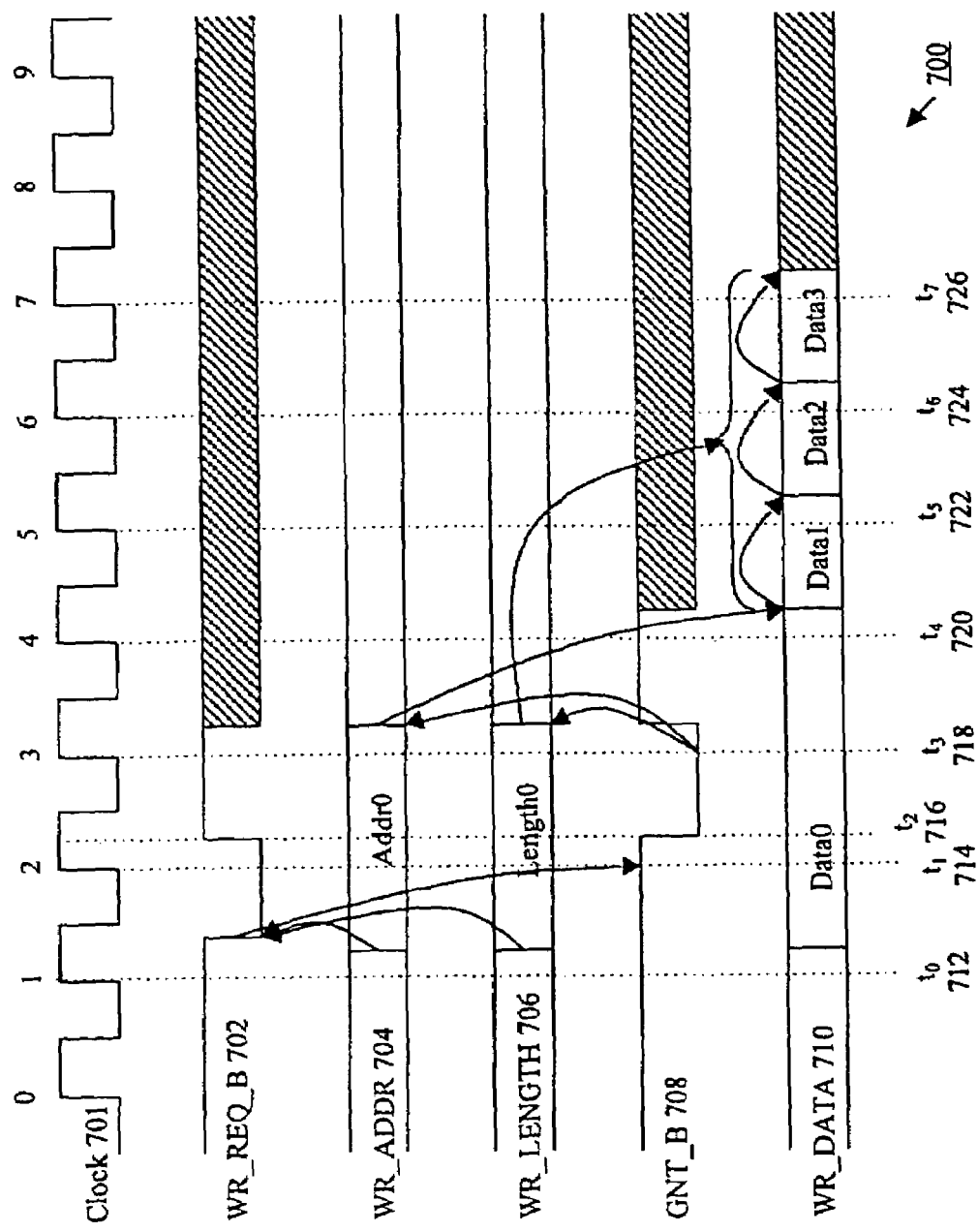
FIG. 7A depicts a timing diagram depicting the interaction of various signals used to effect a write operation in a synchronous communications bus protocol according to the present invention.
Figure 7B:
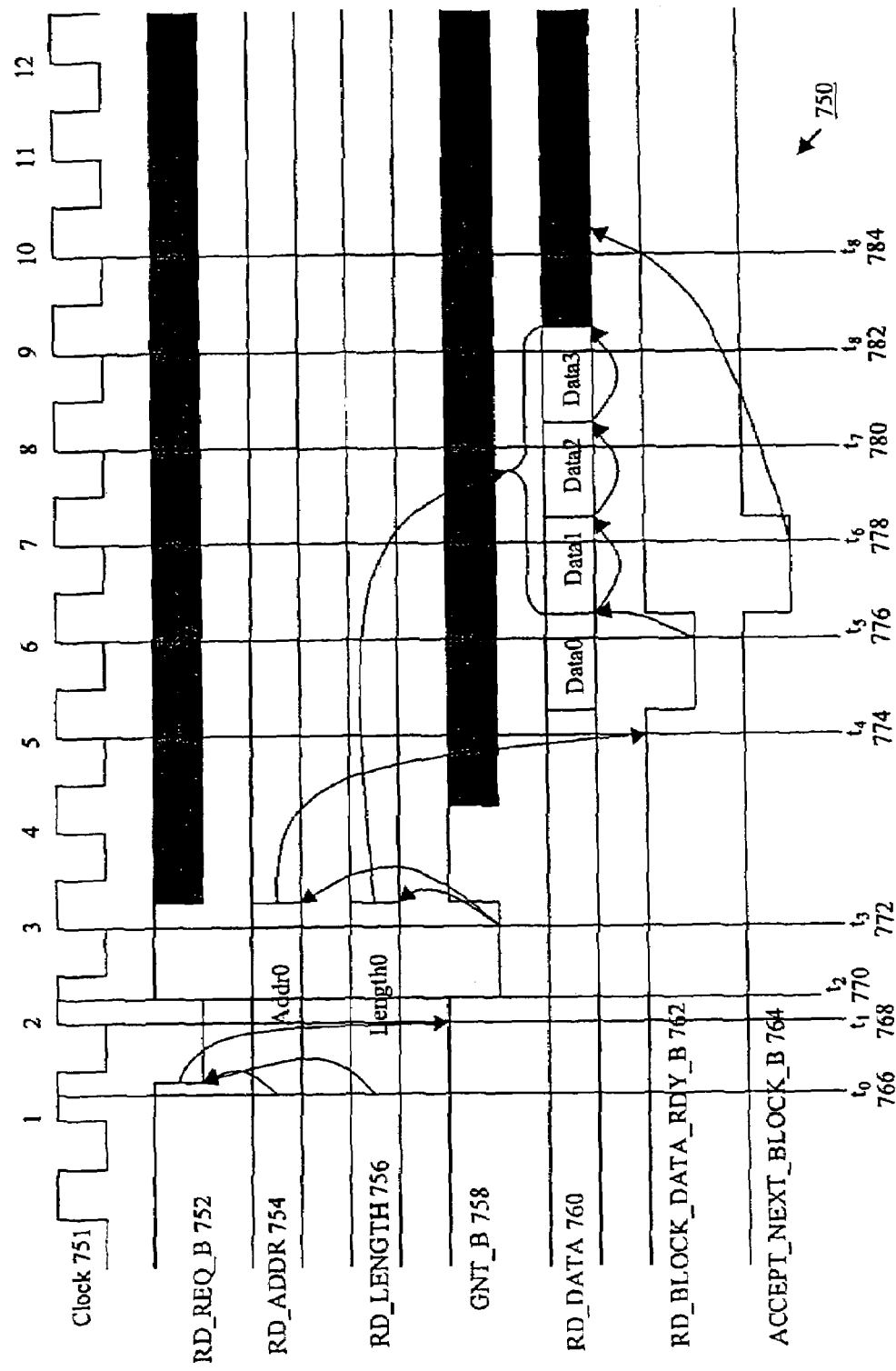
FIG. 7B depicts a timing diagram depicting the interaction of various signals used to effect a read operation in a synchronous communications bus protocol according to the present invention.

With an understanding of a hardware implementation of the present invention, timing diagrams 700 and 750 of FIGS. 7A and 7B are next described. FIG. 7A shows a timing diagram 700 illustrating a write operation of the communications bus of the present invention. Because it is synchronous protocol, the initiator unit and the target unit operate based on a master clock 701. In the proceeding discussion, logic devices are described as activating active level low signals. One of skill in the art will understand, however, that active level high signals can also be used with the present invention. In a situation where the initiator unit writes data to the target unit, the initiator unit prepares the write data WR_DATA 710 at time t0 712. In a substantially simultaneous manner, a block address WR_ADDR 704 and a length of the write data, WR_LENGTH 706, are determined for the write data WR_DATA 710. With this information available, a write request, WR_REQ_B 702, is activated a short time after t0 712. Responsive to the write request WR_REQ_B 702, the target unit is made aware at the next clock cycle t1 714 that the initiator unit is prepared to write a block of data WR_DATA 710 with an associated block address 704 and an associated write length WR_LENGTH 706. A time after t1 714, the target unit grants the write request by asserting the bus grant signal GNT_B 708. As shown in FIG. 7A, the bus grant signal GNT_B 708 is provided at time t2 716 which is within the same clock cycle as time t1 714. Importantly, the bus grant signal need not occur within the same clock cycle as required by some prior art systems. In the present invention, the bus grant signal can occur any time after having received write request WR_REQ_B 702. Also notable is that write request WR_REQ_B 702 need not be maintained as an active signal for more than one clock cycle. After the initiator unit delivers the write request signal WR_REQ_B 702 and the target unit receives this signal, the initiator unit removes the write request signal WR_REQ_B 702 at time after t1 714.

When the target unit provides the bus grant signal GNT_B 708 at time t2 716, the target receives the block address WR_ADDR 704 and the write length WR_LENGTH 706 at time after time t3 718 as shown in FIG. 7A. The target unit then prepares to receive the identified length of data WR_LENGTH 706 having an associated block address WR_ADDR 704. Importantly, after having received such information, the target unit removes the bus grant signal GNT_B 708 as shown. At time t4 720, the target unit proceeds to receive data having write length WR_LENGTH 706 and block address WR_ADDR 704. In the example shown in FIG. 7A, the write length is four items of information which are received after times t4 720, t5 722, t6 724 and t7 726; recall that real-world delays are associated with transmitting and processing information.

One of skill in the art will appreciate that the present invention eliminates various round-trip delays associated with continually monitoring write request and bus grant signals. The present invention, however, decouples write request and bus grant signals by only needing such information for one clock cycle. The present invention provides similar advantages when reading information.

Shown in FIG. 7B is a timing diagram 750 illustrating a read operation of the communications bus of the present invention. Because it is a synchronous protocol, the initiator unit and the target unit operate based on a master clock 751. In a situation where an initiator unit reads data from a target unit, the initiator unit activates a block address RD_ADDR 754 signal and a length of the read data, RD_LENGTH 756, signal for the data RD_DATA 710 to be read. With this information available, a read request, RD_REQ_B 752, is activated a short time after t0 766. Responsive to the read request RD_REQ_B 752, the target unit is made aware at the next clock cycle t1 768 that the initiator unit is prepared to read a block of data RD_DATA 760 with an associated block address RD_ADDR 754 and an associated read length RD_LENGTH 756. A time after t1 768, the target unit grants the read request by asserting the bus grant signal GNT_B 758. As shown in FIG. 7B, bus grant signal GNT_B 758 is provided at time t2 770 which is within the same clock cycle as time t1 768. Importantly, the bus grant signal need not occur within the same clock cycle, as required by some prior art systems. In the present invention, the bus grant signal can occur any time after having received read request RD_REQ_B 752. Also notable is that read request RD_REQ_B 752 need not be maintained as an active signal for more than one clock cycle. Once the initiator unit has delivered the read request signal RD_REQ_B 752 and the target unit has received this signal, the initiator unit can remove the read request signal RD_REQ_B 752 at time after t1 768.

When the target unit provides the bus grant signal GNT_B 758 at time t2 770, the target unit captures the block address RD_ADDR 754 and the read length RD_LENGTH 756 at a time after time t3 772 as shown in FIG. 7B. The target unit then prepares to transmit the identified length of data RD_LENGTH 756 having an associated block address RD_ADDR 754. Importantly, after having received such information, the target unit removes the bus grant signal GNT_B 758, as shown. At time t4 774, the target unit is prepared to transmit the desired read data having read length RD_LENGTH 756 and block address RD_ADDR 754. Responsively, the target unit provides signal RD_BLOCK_DATA_RDY_B 756 indicating that the block of read data is ready to be transferred from the target unit to the initiator unit. As shown in FIG. 7B, the difference in time between time t3 772 and time t4 774 corresponds to the time required to prepare the desired read data. Where information is to be read from a memory, several memory cycles may be required to retrieve the desired information. Note that the signal RD_BLOCK_DATA_RDY_B 756 need only be provided for one clock cycle. Responsive to RD_BLOCK_DATA_RDY_B 756, the target unit then proceeds to transmit data beginning at time t5 776. As shown in FIG. 7B, the read length is four items of information which are received after times t5 776, t6 778, t7 726, and t8 782.

Further shown in FIG. 7B is signal ACCEPT_NEXT_BLOCK_B 764 that is generated by the target unit to indicate to the initiator unit that a next block of data is ready and will be transmitted immediately after the present transfer of data is complete. For example, as shown in FIG. 7B signal ACCEPT_NEXT_BLOCK_B 764 occurring at time t6 778 indicates that after the block transfer of four items of information, Data0 through Data3, a next block of data will be transmitted beginning at time t8 782. Signal ACCEPT_NEXT_BLOCK_B 764 is generated in a manner similar to signal RD_BLOCK_DATA_RDY_B 762 when further read requests RD_REQ_B 752 and request grants 758 overlap with a transfer of a block of read data. In this manner, processing and block data transfers are pipelined. Where processing is decoupled from data transfer, the communications bus can be more efficiently used by providing more continuous use.

Figure 8A:
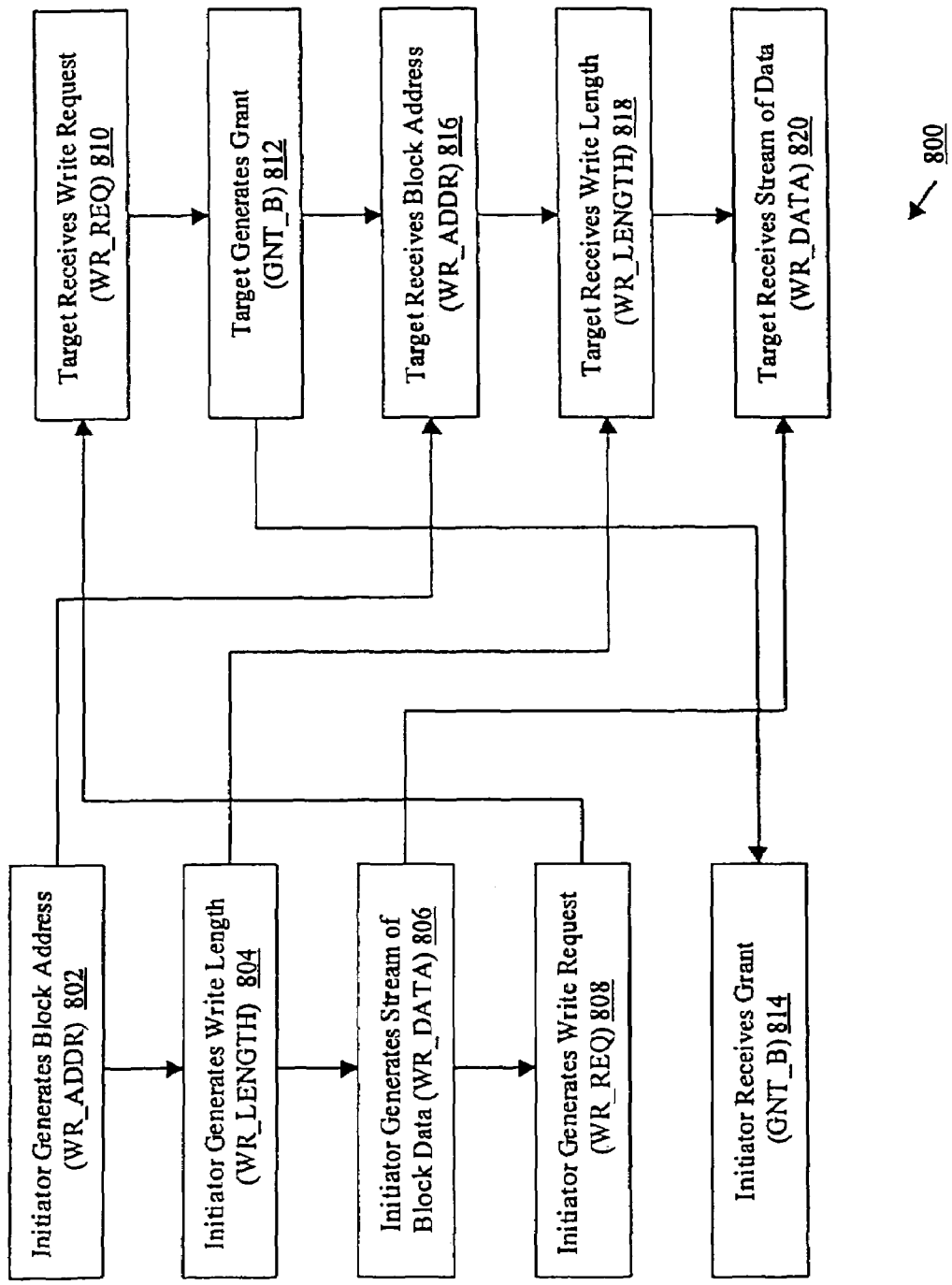
FIG. 8A is a flowchart for a method for writing information from an initiator unit to a target unit over a communications bus according to the present invention.
Figure 8B:
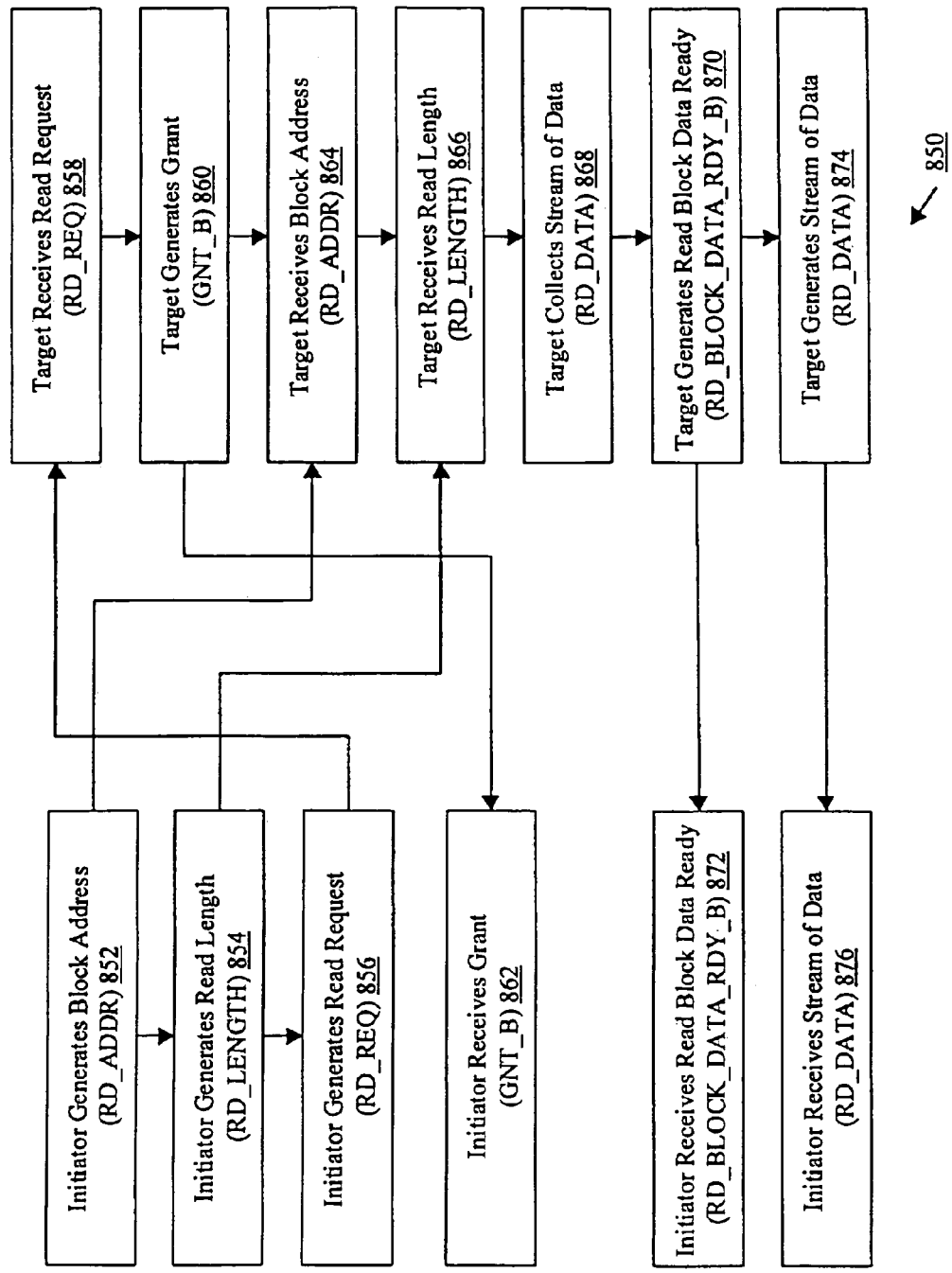
FIG. 8B is a flowchart for a method for reading information from a target unit to an initiator unit over a communications bus according to the present invention.

To better understand the present invention, FIGS. 8A and 8B provide flow diagrams of the methods of the present invention. Shown in FIG. 8A is a method 800 of the present invention for writing information from an initiator unit to a target unit over a communications bus; shown in FIG. 8B is a method 850 of the present invention for reading information from a target unit to an initiator unit over a communications bus.

Referring to FIG. 8A, an initiator unit prepares to write a block information to a target unit by generating a block address, at step 802, and generating a write length, at step 804. The initiator unit further prepares the stream of block data that will be transferred at step 806. Such stream of data has a first item of data and a last item of data and is transferred as consecutive items of information. Because the initiator unit is then prepared to transfer information to the target unit, the initiator unit generates a write request, at step 808, which request is then received by the target unit at step 810. In an embodiment of the invention, the initiator only generates the write request, at step 808, for one clock cycle. The target unit can then assess whether it is prepared to receive a block of write data. When the target unit is prepared to accept a block of write data, it generates a grant, at step 812, which is received by the initiator unit at step 814. In an embodiment of the invention, the target generates a grant, at step 812, for only one clock cycle. The target unit then receives the block address, at step 816, and the write length at step 818. At step 820, the target unit receives the steam of data. In receiving the stream of data at step 820, the target unit expects a block of data having a write length as determined at step 818. The target unit will then associate the received block of data with a block address as determined at step 816. In an embodiment of the invention where a write request at step 808 and a grant at step 812 are generated for only one clock cycle, many steps of method 800 can be pipelined to maximize the use of the communications bus and thereby the effective rate of data transfer. For example, steps 802 through 818 can be executed while step 820 is being executed.

Referring now to FIG. 8B, an initiator unit prepares to read a block of information from a target unit by generating a block address at step 852 and generating a read length at step 854. The initiator unit is then prepared to receive (i.e., read) information from the target unit. The initiator unit generates a read request, at step 856, which is then received by the target unit at step 858. In an embodiment of the invention, the initiator only generates the read request at step 858 for one clock cycle. The target unit then prepares the desired read information. Moreover, the target unit can assess whether it is prepared to transfer a block of read data. When the target unit is prepared to transfer a block of read data, the target unit generates a grant, at step 860, which is received by the initiator unit at step 862. In an embodiment of the invention, the target generates a grant at step 860 for only one clock cycle. The target unit then receives the block address at step 864 and the read length at step 866. With the block address and the read length, the target unit collects and prepares the stream of block data that is to be transferred at step 868. Step 868 can include other steps such as retrieving information form a memory or performing certain calculations. The stream of data has a first item of data and a last item of data and is transferred as consecutive items of information. At step 870, the target generates a signal RD_BLOCK_DATA_RDY_B 870 that indicates that the block of read data is ready to be transferred. The initiator unit receives such signal at step 872. Responsively, the initiator unit prepares to receive the block of read data. The target then transmits the stream of read data, at step 874, which the initiator receives at step 876. In receiving the stream of read data at step 876, the initiator unit expects a block of data having a read length as determined at step 854. The initiator unit then associates the received block of read data with a block address as determined at step 852. In an embodiment of the invention where a read request at step 856 and a grant at step 860 are generated for only one clock cycle, many steps of method 850 can be pipelined to maximize the use of the communications bus and thereby the effective rate of data transfer. For example, steps 852 through 872 can be executed while step 874 is being executed.

The foregoing descriptions of specific embodiments of the present invention have been presented for purposes of illustration and description. They are not intended to be exhaustive or to limit the invention to the precise forms disclosed. Many modifications and variations are possible in light of the above teachings without deviation from the scope of the claims set out below. The embodiments were chosen and described in order to best explain the principles of the invention and its practical application, to thereby enable others skilled in the art to best utilize the invention and various embodiments with various modifications as are suited to the particular use contemplated.

What is claimed is:

1. A method of performing a data transfer from an initiator unit to a target unit over a bus interconnecting the initiator unit and target units, the method comprising:
   providing a starting write address and write length information on the bus synchronously with a clock signal;
   while the starting write address and write length information are present on the bus, providing a write request signal that is activated and deactivated synchronously with a clock cycle of the clock signal;
   while the write request signal is deactivated, receiving from the target unit a grant signal that is activated and deactivated synchronously with a clock cycle of the clock signal; and
   after the grant signal is deactivated, providing a number of write data items on the bus synchronously with the clock for capture by the target unit, one data item provided in each clock cycle of the clock signal, the number of data items being determined by the write length information provided.

2. The method of claim 1, wherein the operation of providing a write request signal further comprises providing an active write request signal for a duration of approximately one clock cycle.

3. The method of claim 1, wherein the operation of receiving a grant signal further comprises receiving an active grant signal for a duration of approximately one clock cycle.

4. The method of claim 1,
   wherein the operation of providing a write request signal further comprises providing an active write request signal for a duration of more than one clock cycle, and
   wherein the operation of receiving a grant signal further comprises receiving an active grant signal for a duration of more than one clock cycle.

5. The method of claim 4, wherein the operation of providing the active write request signal further comprises providing the active write request signal during a time duration that is different than a time duration of the operation of receiving the active grant signal.

6. A method of performing a data transfer as recited in claim 1, wherein the initiator unit performs the step of providing the starting write address and write length information.

7. A method of performing a data transfer as recited in claim 1, wherein the initiator unit performs the step of providing the write request signal.

8. A method of performing a data transfer as recited in claim 1, wherein the initiator unit performs the step of providing a number of write data items on the bus.

9. A method of performing a data transfer from an initiator unit to a target unit over a bus interconnecting the initiator unit and target units, the method comprising:
   while a starting write address and write length information are present on the bus, receiving from the initiator unit a write request signal that is activated and deactivated synchronously with a clock cycle of the clock signal;
   while the write request signal is deactivated, providing to the initiator unit a grant signal that is activated and deactivated synchronously with a clock cycle of the clock signal, the starting write address and write length information being captured during the activated request signal; and
   after the deactivation of the grant signal, capturing a number of write data items on the bus synchronously with the clock signal, one write data item captured in each clock cycle of the clock signal, the number of write data items being determined by the write length information provided.

10. The method of claim 9 wherein the operation of providing a write request signal further comprises providing an active write request signal for a duration of approximately one clock cycle.

11. The method of claim 9, wherein the operation of receiving a grant signal further comprises receiving an active grant signal for a duration of approximately one clock cycle.

12. The method of claim 9,
    wherein the operation of providing a write request signal further comprises providing an active write request signal for a duration of more than one clock cycle, and
    wherein the operation of receiving a grant signal further comprises receiving an active grant signal for a duration of more than one clock cycle.

13. The method of claim 12, wherein the operation of providing the active write request signal further comprises providing the active write request signal during a time duration that is different than a time duration of the operation of receiving the active grant signal.

14. A method of performing a data transfer as recited in claim 9, wherein the target unit performs the step of providing to the initiator unit a grant signal.

15. A method of performing a data transfer as recited in claim 9, wherein the target unit performs the step of capturing a number of write data items.

16. A method of performing a data transfer from a target unit to an initiator unit over a bus interconnecting the initiator unit and target units, the method comprising:
    providing a starting read address and read length information on the bus synchronously with a clock signal;
    while the starting read address and read length information are present on the bus, providing a read request signal that is activated and deactivated synchronously with a clock cycle of the clock signal;
    while the read request signal is deactivated, receiving a grant signal from the target unit that is activated and deactivated synchronously with a clock cycle of the clock signal; and
    after the grant signal is deactivated,
    receiving a block ready signal from the target unit, and
    capturing a number of read data items on the bus synchronously with the clock signal, one read data item provided in each clock cycle of the clock signal, the number of read data items being determined by the read length information provided.

17. The method of claim 16, wherein the operation of providing a read request signal further comprises providing an active read request signal for a duration of approximately one clock cycle.

18. The method of claim 16, wherein the operation of receiving a grant signal further comprises receiving an active grant signal for a duration of approximately one clock cycle.

19. The method of claim 16,
    wherein the operation of providing a read request signal further comprises providing an active read request signal for a duration of more than one clock cycle, and
    wherein the operation of receiving a grant signal further comprises receiving an active grant signal for a duration of more than one clock cycle.

20. A method of performing a data transfer as recited in claim 16, wherein the initiator unit performs the step of providing the starting read address and read length information.

21. A method of performing a data transfer as recited in claim 16, wherein the initiator unit performs the step of providing the read request signal.

22. A method of performing a data transfer as recited in claim 16, wherein the initiator unit performs the step of receiving a block ready signal.

23. A method of performing a data transfer as recited in claim 16, wherein the initiator unit performs the step of capturing a number of read data items on the bus.

24. A method of performing a data transfer from a target unit to an initiator unit over a bus interconnecting the initiator unit and target units, the method comprising:

while a starting read address and read length information are present on the bus, receiving from the initiator unit a read request signal that is activated and deactivated synchronously with a clock cycle of the clock signal;

while the read request signal is deactivated, providing to the initiator unit a grant signal that is activated and deactivated synchronously with a clock cycle of the clock signal, the starting read address and read length information being captured during the activated grant signal; and after the deactivation of the grant signal, providing a block ready signal that is activated and deactivated synchronously with a clock cycle of the clock signal, and providing a number of read data items on the bus synchronously with the clock signal, one read data item provided in each clock cycle of the clock signal, the number of read data items being determined by the read length information provided.

25. The method of claim 24, wherein the operation of providing a read request signal further comprises providing an active read request signal for a duration of approximately one clock cycle.

26. The method of claim 24, wherein the operation of receiving a grant signal further comprises receiving an active grant signal for a duration of approximately one clock cycle.

27. The method of claim 24, wherein the operation of providing a read request signal further comprises providing an active read request signal for a duration of more than one clock cycle, and wherein the operation of receiving a grant signal further comprises receiving an active grant signal for a duration of more than one clock cycle.

28. A method of performing a data transfer as recited in claim 24, wherein the target unit performs the step of providing a block ready signal.

29. A method of performing a data transfer as recited in claim 24, wherein the target unit performs the step of providing to the initiator unit a grant signal.

30. A method of performing a data transfer as recited in claim 24, wherein the target unit performs the step of providing a number of read data items on the bus.

* * * * *